United States Patent [19]

Yantovsky et al.

[11] Patent Number: 4,464,617
[45] Date of Patent: Aug. 7, 1984

[54] SUPERCONDUCTING SYNCHRONOUS ELECTRIC MACHINE

[75] Inventors: Leonid I. Yantovsky; Anatoly G. Miroshnichenko; Evgeny K. Berzin, all of Kharkov, U.S.S.R.

[73] Assignee: Kharkovsky Politekhnichesky Institut, Kharkov, U.S.S.R.

[21] Appl. No.: 333,867

[22] PCT Filed: Apr. 25, 1980

[86] PCT No.: PCT/SU80/00064
§ 371 Date: Dec. 18, 1981
§ 102(e) Date: Dec. 18, 1981

[87] PCT Pub. No.: WO81/03091
PCT Pub. Date: Oct. 29, 1981

[51] Int. Cl.³ .............................................. H02P 7/36
[52] U.S. Cl. ...................................... 318/717; 310/58; 310/68 D; 323/237; 323/360
[58] Field of Search ............... 310/10, 162, 184, 52, 310/163, 68 R, 64, 68 D, 198, 204–207; 318/803, 717; 323/245, 243, 237, 360; 363/128, 129; 307/22, 26

[56] References Cited

U.S. PATENT DOCUMENTS

| | | | |
|---|---|---|---|
| 3,478,543 | 11/1969 | Drexler | 310/180 |
| 3,611,097 | 10/1971 | Joslyn | 323/237 |
| 3,702,965 | 11/1972 | Drexler | 310/68 R |
| 3,742,265 | 6/1973 | Smith | 310/52 |
| 3,924,147 | 12/1975 | Tarnow | 310/68 R |
| 4,019,105 | 4/1977 | Cornell | 318/803 |
| 4,058,746 | 11/1977 | Mole | 310/52 |
| 4,078,393 | 3/1978 | Willis | 323/245 |
| 4,164,705 | 8/1979 | Whitney | 310/68 D |

FOREIGN PATENT DOCUMENTS

| | | | |
|---|---|---|---|
| 2027673 | 11/1972 | Fed. Rep. of Germany | 310/52 |
| 369659 | 4/1973 | U.S.S.R. | 310/52 |
| 396792 | 1/1974 | U.S.S.R. | 310/52 |

OTHER PUBLICATIONS

A New Thyristor Controlled VAR Compensator Design; A. E. Hammad et al; Canadian Comm. & Pwr. Conf.; Montreal, Canada; Oct. 18–20, 1978.
"Converter Elements" by V. S. Rudenko; Moskau, 1980, pp. 113–116.

Primary Examiner—R. Skudy
Attorney, Agent, or Firm—Lilling & Greenspan

[57] ABSTRACT

The electric machine comprises a multiphase armature winding 6, a superconducting field winding 4, and a multiphase compensating winding 3 constructed in the form of sections 10. Each phase of the winding 3 is connected in series to one of the phases of the armature winding 6 through a sliding contact. The sections 10 comprise conductors of all the phases, and each phase of the winding 3 is so connected to a separate rectifier 14, 15, 16 that a unidirectional current flows therethrough.

6 Claims, 7 Drawing Figures

SUPERCONDUCTING SYNCHRONOUS ELECTRIC MACHINE

TECHNICAL FIELD

1. Background of the Invention

The invention relates to the art of electrical engineering, and particularly to a superconducting synchronous electric machine.

2. Background Art

Known in the art is a direct current electric machine (German accepted patent application No. 2,027,673, Cl. H02K 23/58, published in 1972) which is provided with a compensating winding equalizing an electromagnetic movement of reaction of an armature, acting on a superconducting excitation winding. The above specified electric machine provides a principal solution to the problem of compensating the armature reaction.

However, with varying loads on the shaft, the value of the electromagnetic moment acting on the superconducting winding changes. At the same time, it is necessary to provide for a continuous control of the value of a current flowing through the compensating winding depending on the value of a current within the armature winding, in order to obtain compensation under any loading conditions. Such a control should be carried out in an inertialess manner since the mismatch (lag and advance) of the currents within compensating and armature windings is not permissible. Otherwise, even the instantaneous absence of compensation of the reaction moment of the armature results in the failure of supports of the superconducting winding due to large mechanical loads.

Attempts have been made to solve this problem. Thus, known in the art is an electric machine (USSR Author's Certificate No. 396,792 Int. Cl. H02K 19/00, Published Aug. 29, 1973) wherein the compensation of the armature reaction moment is ensured by means of two windings which are movable with respect to each other. In this electric machine the excitation winding (field) consists of two windings one of which is superconducting and the other is compensating. The superconducting winding is disposed inside the rotating armature, while the other winding is located outside this armature. In order to compensate the armature reaction moment and to eliminate forces acting on the superconducting winding mounted in a cryostat, this winding is rotatably mounted with respect to the other (compensating) winding. Under the conditions of load variations in this machine it is necessary to ensure a corresponding change in the angle of rotation of the superconducting winding relative to the compensating winding, which is accompanied by considerable performance and design difficulties, especially because of mechanical sluggishness of the cryostat with the superconducting winding.

Also known in the art is a synchronous electric machine (USSR Author's Certificate No. 369,659 Int. Cl. H02K 3/20, Published Feb. 8, 1973) wherein there is provided an automatic compensation of the armature reaction moment.

The above machine comprises a field provided with a superconducting excitation winding, a compensating winding, and a current collecting device comprising a commutator and brushes. A compensating device is constructed as a distributed compensating winding which is stationary with respect to the field structure and is provided with pairs of poles whose number is equal to that of the machine. This compensating winding is connected in series, through the commutator and brushes fixed stationary with respect to the field, to the armature winding, the axes of phases of the compensating winding displaced relative to the axes of phases of the armature winding by an angle of 180°. To decrease a voltage between commutator bars, the armature winding is proposed to be connected to the compensating winding through current transformers.

In this electric machine the armature reaction flow rotates in synchronism with the field, and to compensate the above flow it is necessary to create a rotating opposite flow of the compensating winding. In the considered machine the compensating winding which is stationary relative to the armature is formed by means of the commutator and brushing device. The latter forms a required number of phases from the total number of turns of the collector winding. In the process of rotation of the field with the compensating winding disposed thereon, the brushing device is stationary relative to the armature winding, the phases of the compensating winding disposed therebetween being also stationary. The composition of winding sections included into each phase is continuously changing. Power supply of the compensating winding with alternating current is ensured by the magnetic flow rotating relative to the armature winding and stationary with respect to the field structure. The function of the commutator and brushing device in this synchronous machine consists in switching the winding turns and forming phases of the compensating winding in contrast to the function of a rectifier in the direct current machine.

Closing the circuits of phases of the armature winding through the circuits of the compensating winding requires the availability of special sensitive protection instrumentation in the circuit of each phase of the armature winding for the case of open- or short-circuit in any section of the compensating winding. Open or short circuit does not result in breaking the armature winding circuit, though in this case the field of the compensating winding is distorted and its magnitude is decreased, which is inadmissible. The presence of the brushing device and commutator and their operation from an alternating current power supply results in further complication of the machine and reduces reliability thereof.

Feeding the compensating winding through current transformers for the purpose of decreasing the voltage between the commutator bars is inadmissible since the presence of transformers in the feeding circuits of the compensating winding leads to the lag of changing the compensating field following the change in the armature field due to the electrical inertia of the current transformers. All this results in complication of both the machine and its maintenance, and consequently in a decrease in its performance reliability.

SUMMARY OF THE INVENTION

The invention is based on the problem to provide a synchronous electric machine whose performance reliability would be upgraded due to improving the design of the compensating winding and power supply means thereof.

The object set forth is attained in a synchronous electric machine, comprising a multiphase armature winding a superconducting field, and a multiphase compensating winding made in the form of sections, each phase of the compensating winding being connected in series through a sliding contact to one of the phases of the armature winding, according to the invention each section of the compensating winding comprises conductors of all the phases, and each phase of the compensating winding is connected to a separate rectifier so that a unidirectional current would flow therethrough.

The provision of each section of the compensating winding from a combination of conductors of all the phases, separate feeding thereof through the rectifiers, and series connection thereof into the phases of the armature winding ensures the total current of a composite conductor of the section being constant and proportional to the armature current at any instant of time and provides an inertialess and automatic compensation of reaction movement of the armature.

Such connection of the phases of the compensating and armature windings ensures the flow of the same current therethrough, therefore any emergency variation of parameters of any of these windings causes a change in the current flowing therethrough.

Thus, the system used for the armature protection simultaneously protects the compensating winding thereby eliminating the need of additional devices for the protection of the latter. The absence of a section commutator and a phase former of the compensating winding, i.e. an alternating current operated collector, results in the simplification of the machine and in an increase in the performance reliability thereof.

It is advantageous to construct the claimed synchronous electric machine so that each phase of the compensating winding be divided into two branches connected antiparallel therebetween and connected to separate rectifiers.

Such a design is the most suitable for low-voltage machines since it allows the number of rectifier components to be reduced, thereby upgrading reliability of such machines.

In high-power machines it is reasonable to transpose the conductors of different phases of the compensating winding therebetween.

In the above specified group of machines in the case where the dimensions of a conductor of the compensating winding become comparable with the distance between the compensating winding and the field winding, the location of conductors of different phases within the section of the compensating winding influences the form of a compensating field, and consequently the compensating moment. At the same time, the above described arrangement of the compensating winding allows the distortions of the form of a compensating field to be reduced.

It is rather convenient to utilize reversible rectifiers in the claimed synchronous electric machine, by means of which the phases of the compensating winding are connected in series to the circuits of the phases of the armature windings, and to mount a sign-sensitive torque transducer on the armature shaft, the output of said transducer being connected to an input of a control device which is electrically coupled to said reversible rectifiers.

BRIEF DESCRIPTION OF DRAWINGS

The invention is further explained in greater detail in terms of specific embodiments thereof with reference to the accompanying drawings, in which.

DESCRIPTION OF THE PREFERRED EMBODIMENTS

Figure 1:
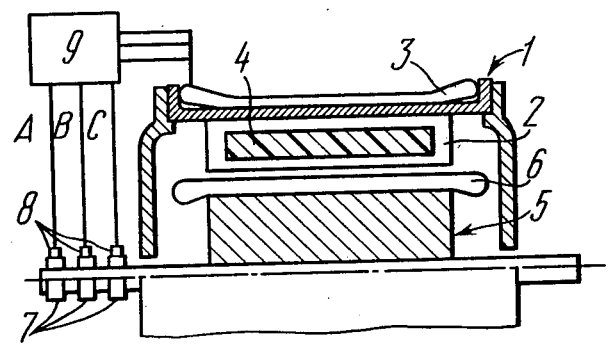
FIG. 1 shows a longitudinal section of a portion of the inventive synchronous electric machine.

A synchronous electric machine comprises a stator 1 (FIG. 1) on which there are mounted a cryostat 2 and a compensating winding 3. Inside the cryostat 2 are located a super-conducting field winding 4 and a rotatable armature 5 provided with a multiphase winding 6 which is connected to a rectifying device 9 and the compensating winding 3 through contact rings 7 and brushes 8. The compensating winding 3 is fixed on the stator 1 and is at a normal temperature.

Figure 2:
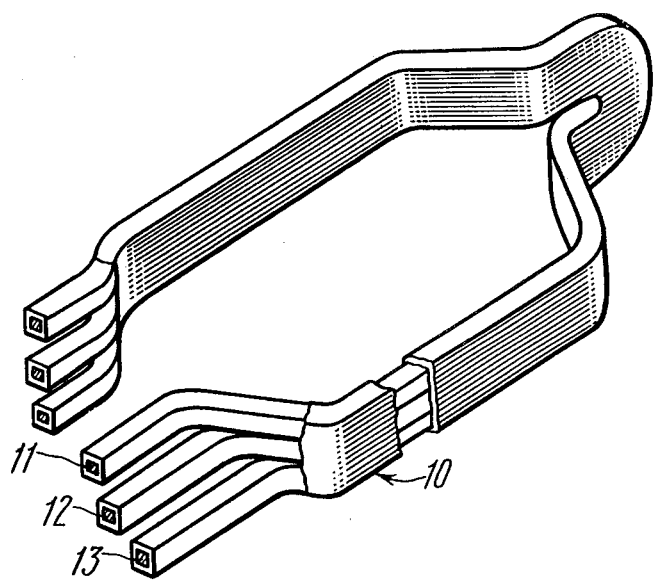
FIG. 2 shows an embodiment of a section of the compensating winding of the claimed synchronous electric machine.

A section 10 (FIG. 2) of the compensating winding 3 is a combination of conductors 11, 12, 13 of different phases. For instance, the conductor 11 is connected to a phase A, the conductor 12, into a phase B, and the conductor 13, into a phase C. As shown in FIG. 2, the section 10 is provided with a bend in the front portion thereof. Such a transposition of conductors can be adequate in the case where the dimensions of the section 10 are commensurate with a distance between the compensating winding 3 and the field winding 4. For high power machines the transposition of the phase conductors 11, 12, 13 within a slot portion of the section 10 may be expedient.

Figure 3:
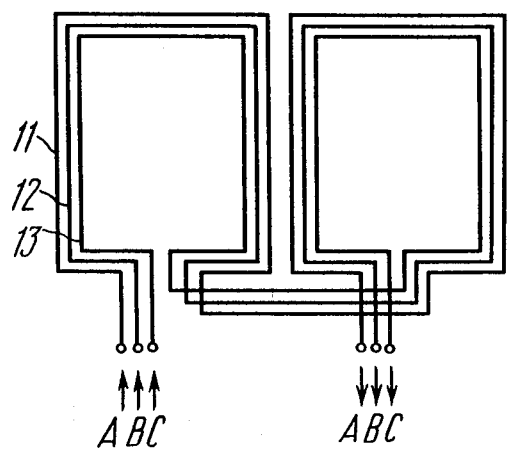
FIG. 3 shows a modification of a connection diagram of adjacent sections of the compensating winding, of which one is illustrated in FIG. 2.

Starting and end points of the phase conductors 11, 12, 13 (FIG. 3) are connected either in series under high voltage supply of the machine or in parallel under low voltage. The conductors 11 of all the sections of the compensating winding 3 form the phase A of this winding, the conductors 12, the phase B, and the conductors 13, the phase C.

Figure 4:
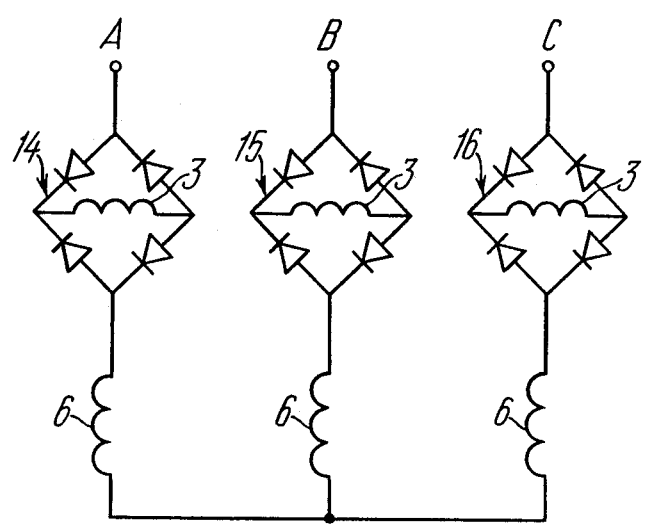
FIG. 4 shows a connection diagram of the armature winding, compensating winding, and rectifiers of the claimed synchronous electric machine.

In the preferred embodiment of the invention the rectifying device 9 is composed of three rectifying bridge circuits 14, 15, 16 (FIG. 4), one of the phases A, B, C of the compensating winding 3 being connected to the diagonal of each of said circuits.

To reduce the number of components of the rectifying device 9, in low voltage machines each phase of the compensating winding 3 can be divided into two branches 17, 18 (FIG. 5) which are connected anti-parallel to separate rectifiers 19, 20.

In the case of changing the sign of the electromagnetic moment of the armature, (e.g. when reversing the motor), the sign of the compensating electromagnetic moment must be changed as well, for which purpose the direction of current within the compensating winding is to be changed for the opposite.

According to one embodiment of the invention, this is attained by providing reversible rectifying bridge circuits 14, 15, 16. A conventional reversible converter 21 can be used as such reversible rectifying bridge circuit, the legs of said circuit being formed by thyristors connected anti-parallel. The above converters can be controlled by means of a suitable conventional control device 22 which are widely applied in the industry. The input of the device is connected to the output of a sign-sensitive transducer 23 of the torque, said transducer being mounted on the armature shaft 24. The sign-sensitive transducer 23 of the torque may be a transducer of a conventional design, which is a magnetoelastic circular torsiometer whose operation is based on the measurement of variations in the magnetic permeability of ferromagnetic bodies depending on mechanical stresses appearing under the action of the applied forces.

The synchronous electric machine operates as follows.

Figure 7:
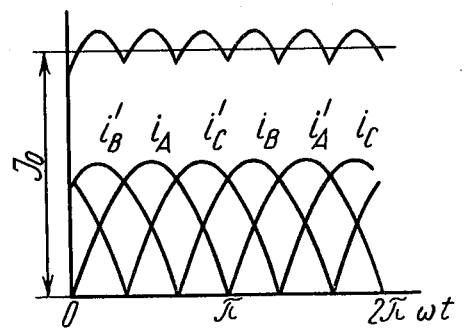
FIG. 7 shows the law of current time variation in the compensating winding.

In the process of operation of the machine there appears an electromagnetic moment of the armature reaction, said moment acting on the field winding 4. The compensating winding 3 creates a moment acting on the field winding 4 and compensating a moment of the current flowing in the winding 6 of the armature. Rectified half-waves of phase currents $i_A-i'_A$, $i_B-i'_B$, $i_C-i'_C$ (FIG. 7) flow through each of the phase conductors 11, 12, 13 of the compensating winding 3, said half-waves being shifted in time. The total current within the section of the compensating winding 3 is equal to the sum of currents of the phase conductors and has a constant value with an average magnitude of $I_o$. The value $I_o$ varies corresponding to the changes in the phase currents of the armature reaction moment under variable loads.

Figure 5:
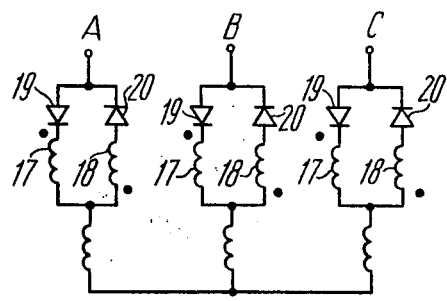
FIG. 5 shows another modification of the diagram shown in FIG. 4, utilized for low-voltage machines, of the invention.
Figure 6:
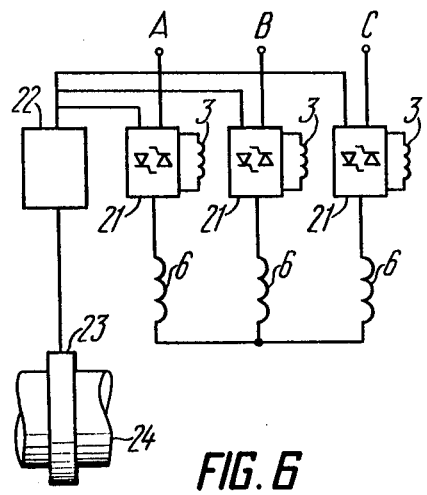
FIG. 6 shows a modification of the diagram illustrated in FIG. 4, utilized in the reversal of the claimed synchronous electric machine.

In the case where the connection of the compensating winding is carried out as illustrated in FIG. 5, half-waves of respective phase currents of the armature winding flow through each parallel branch of the phase of the compensating winding, said half-waves having different directions, but due to the opposing connection of said branches the total current of the composite phase conductor maintains the same direction and magnitude as in the above described case.

When reversing the machine, the reaction moment of the armature changes its sign for the opposite, which leads to the necessity of changing the sign of the compensating momentum created by the compensating winding 3. To accomplish this condition it is necessary to change the directions of currents of the phases of the compensating winding. Such a change is ensured by one embodiment of the invention, wherein the phases of the compensating winding are fed through the reversible converters 21 which ensure a required direction of the current flowing through the compensating winding 3 depending on the direction of the effect of the electromagnetic moment of the armature. The control of the converters 21 is accomplished by means of the control device 22 converting a signal produced by the sign-sensitive transducer 23 of the torque.

The claimed electric machine including an improved design of the compensating winding allows the maintenance thereof to be simplified and the operation reliability to be upgraded.

INDUSTRIAL APPLICABILITY

The invention can be used when providing and developing superconducting synchronous high- and medium power electric machines.

The invention is the most expedient to be utilized as an electric motor in the drives which are characterized by quick-changing loads.

We claim:

1. A superconducting synchronous electric machine, comprising a multiphase armature winding supported on an armature which, in turn, is supported on an armature shaft, a superconducting field winding, and a compensating winding constructed in the form of sections, the compensating winding being connected in series to the armature winding through a sliding contact, characterized in that the compensating winding (3) is made multiphase, sections (10) thereof comprise conductors (11, 12, 13) of all the phases, and each phase of the compensating winding (3) is so connected to a separate rectifier (14, 15, 16) that a unidirectional current flows therethrough and further comprising a sign-sensitive transducer mounted on said armature shaft.

2. A synchronous electric machine as claimed in claim 1, characterized in that each phase of the compensating winding (3) is divided into two branches (17, 18) connected to separate rectifiers (19, 20), said branches being connected anti-parallel therebetween.

3. A synchronous electric machine as claimed in claims 1 or 2, characterized in that conductors of different phases of the compensating winding (3) are transported therebetween.

4. A synchronous electric machine as claimed in claim 1 characterized in that it utilizes reversible rectifiers (21) by means of which the phases of the compensating winding are connected in series to the circuits of phases of the armature winding (6), the output of said transducer being connected to the input of a control device (22), electrically connected with said reversible rectifiers (21).

5. A synchronous electric machine as claimed in claim 2, characterized in that it utilizes reversible rectifiers (21) by means of which the phases of the compensating winding are connected in series to the circuits of phases of the armature winding (6), the output of said transducer being connected to the input of a control device (22), electrically connected with said reversible rectifiers (21).

6. A synchronous electric machine as claimed in claim 3, characterized in that it utilizes reversible rectifiers (21) by means of which the phases of the compensating winding are connected in series to the circuits of phases of the armature winding (6), the output of said transducer being connected to the input of a control device (22), electrically connected with said reversible rectifiers (21).

* * * * *